US009866404B2

(12) United States Patent
Yang

(10) Patent No.: US 9,866,404 B2
(45) Date of Patent: Jan. 9, 2018

(54) ROUTER AND METHOD FOR ESTABLISHING A NETWORK CONNECTION USING THE ROUTER

(71) Applicants: AMBIT MICROSYSTEMS (SHANGHAI) LTD., Shanghai (CN); HON HAI PRECISION INDUSTRY CO., LTD., New Taipei (TW)

(72) Inventor: Shih-Kuo Yang, New Taipei (TW)

(73) Assignees: AMBIT MICROSYSTEMS (SHANGHAI) LTD., Shanghai (CN); HON HAI PRECISION INDUSTRY CO., LTD., New Taipei (TW)

( * ) Notice: Subject to any disclaimer, the term of this patent is extended or adjusted under 35 U.S.C. 154(b) by 98 days.

(21) Appl. No.: 14/879,779

(22) Filed: Oct. 9, 2015

(65) Prior Publication Data
US 2017/0026237 A1  Jan. 26, 2017

(30) Foreign Application Priority Data

Jul. 22, 2015  (TW) .............................. 104123790 A

(51) Int. Cl.
  H04L 12/28  (2006.01)
  H04L 12/931  (2013.01)
  H04L 12/24  (2006.01)
  H04L 12/775  (2013.01)
  H04L 12/773  (2013.01)

(52) U.S. Cl.
  CPC ........ *H04L 12/2856* (2013.01); *H04L 49/602* (2013.01); *H04L 41/0816* (2013.01); *H04L 45/58* (2013.01); *H04L 45/60* (2013.01)

(58) Field of Classification Search
None
See application file for complete search history.

(56) References Cited

U.S. PATENT DOCUMENTS

| 9,215,152 | B2* | 12/2015 | Fayssal | ................. H04L 43/028 |
| 9,277,405 | B2* | 3/2016 | L'Heureux | ........... H04W 12/06 |
| 2013/0163613 | A1 | 6/2013 | Zhao | |
| 2014/0185600 | A1* | 7/2014 | Cheng | ..................... H04L 49/35 |
| | | | | 370/338 |
| 2016/0255456 | A1* | 9/2016 | Lee | ..................... H04L 63/0227 |
| | | | | 455/419 |

FOREIGN PATENT DOCUMENTS

| CN | 102651707 A | 8/2012 |
| CN | 103023734 A | 4/2013 |
| CN | 103200087 A | 7/2013 |
| TW | 201501550 A | 1/2015 |

\* cited by examiner

*Primary Examiner* — Anh Ngoc Nguyen
(74) *Attorney, Agent, or Firm* — Steven Reiss

(57) ABSTRACT

A method for establishing a new network connection using a router includes receiving notification of switching network modes of the router, and detecting whether a new network connection is established by the router. When the new network connection is disabled, the clients are disconnect from a LAN port of the router, a recertification request from the clients is refused, and the recertification request after a first predetermined time duration is received. Thus, a network connection is established.

12 Claims, 3 Drawing Sheets

ROUTER AND METHOD FOR ESTABLISHING A NETWORK CONNECTION USING THE ROUTER

CROSS-REFERENCE TO RELATED APPLICATIONS

This application claims priority to Taiwan Patent Application No. 104123790 filed on Jul. 22, 2015, the contents of which are incorporated by reference herein.

FIELD

The subject matter herein generally relates to network equipment and methods for establishing a network connection.

BACKGROUND

A router is a networking device that forwards data packets between computer networks. The router may include Local Area Network (LAN) ports, Wide Area Network (WAN) ports, and Universal Serial Bus (USB) interfaces. The WAN port can be connected to an outside networks, for example, an Asymmetric Digital Subscriber Line (ADSL) telephone line or wireless telecommunication networks. The LAN port can be connected to an Ethernet switch or a personal computer, and the USB interface can be connected to wireless data cards. When the WAN port is switched from a network to another network, Internet Protocol (IP) address of the WAN port can be changed too, and IP address of the LAN port needs to be updated accordingly.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
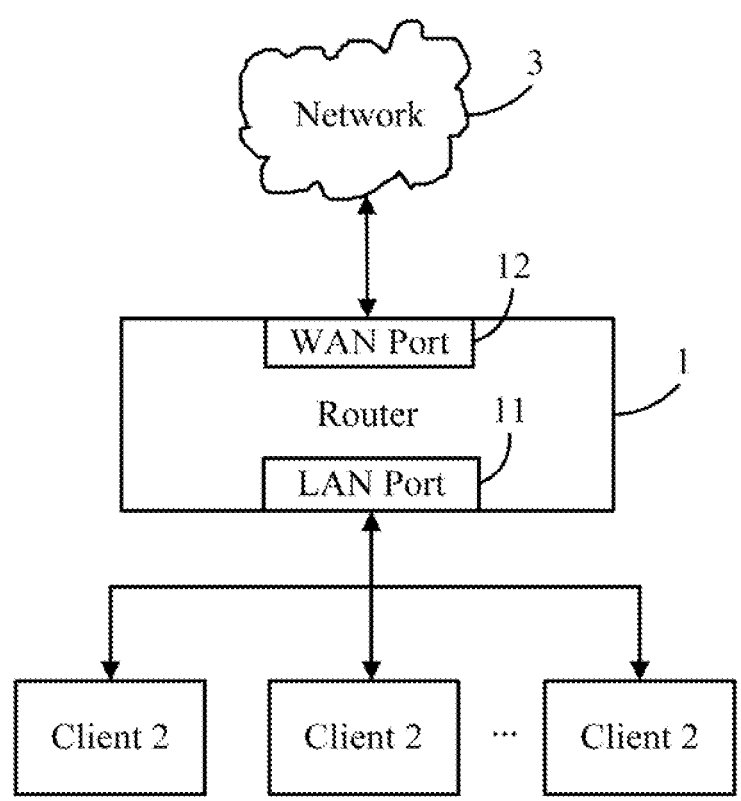
FIG. 1 is a diagrammatic view of an example embodiment of work environment of a router.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY™ flash memory, and hard disk drives. The term "comprising" means "including, but not necessarily limited to"; it specifically indicates open-ended inclusion or membership in a so-described combination, group, series and the like.

FIG. 1 is a diagrammatic view of an example embodiment of work environment of a router 1. In at least one embodiment, each of the clients 2 can be coupled to the router 1 using a local area network (LAN) port 11 of the router 1. The router 1 can be connected to the network 3 using a wide area network (WAN) port 12 of the router 1. The client 2 can be a computer, a smart phone, and any other electronic devices which provide network functions. The network 3 can be Internet, wireless telecommunication networks, for example General Packet Radio Service (GPRS), 3G or 4G or 5G.

Figure 2:
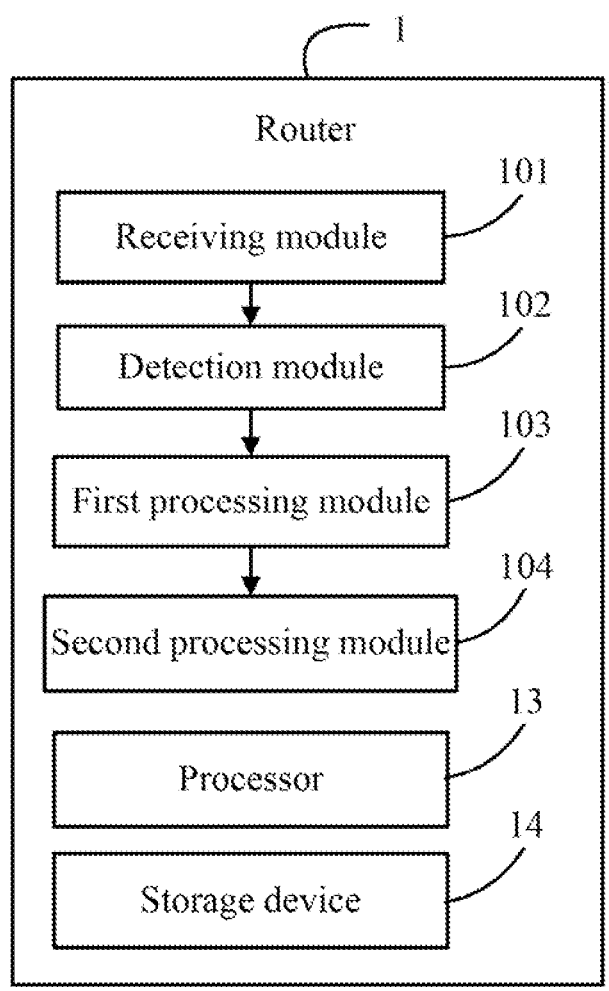
FIG. 2 is a block diagram of an example embodiment of a router.

FIG. 2 is a block diagram of an example embodiment of a router. In at least one embodiment, the router 1 can include a receiving module 101, a detection module 102, a first processing module 103, and a second processing module 104. In at least one embodiment, at least one processor 13 of the router 1 executes one or more computerized codes of the modules 101-104 to establish a network connection. The one or more computerized codes of the modules 101-104 may be stored in a storage device 14.

In at least one embodiment, the storage device 14 can include various types of non-transitory computer-readable storage mediums. For example, the storage device 14 can be an internal storage system, such as a flash memory, a random access memory (RAM) for temporary storage of information, and/or a read-only memory (ROM) for permanent storage of information. The storage device 14 can also be an external storage system, such as a hard disk, a storage card, or a data storage medium. In at least one embodiment, the at least one processor 13 can be a central processing unit (CPU), a microprocessor, or other data processor chip that performs functions of the router 1.

The receiving module 101 can be configured to receive notification of switching network modes of the router 1. In at least one embodiment, the router 1 can support many different wired or wireless network modes. For example, the router 1 can provide access to the Internet or telecommunication networks such as 3G or 4G through the WAN port 12.

In at least one embodiment, the router 1 can be switched among multiple network modes automatically. For example, a user can set a priority of network modes in advance, for example, Wi-Fi hotspot first, 4G second, 3G third, ADSL fourth. The router 1 can try to search for available Wi-Fi hotspot first, then search for 4G networks if no Wi-Fi hotspot is available second, then search for 3G networks if 4G networks are not available, and finally search for available ADSL networks. If a current connectivity of the router 1 to the network 3 is missed, the router 1 will search other available networks and can be switched to the available networks automatically. Upon the current network mode being disabled, a notification can be received by the receiving module 101.

The detection module 102 can detect establishment by the router of a new network. In at least one embodiment, the detection module 102 detects whether a difference value is greater than a predetermined value. When the difference value is greater than the predetermined value, it can be determined the new network connection is established. When the difference value is equal to or less than the predetermined value, it can be determined that no new network connection is established.

In at least one embodiment, the difference value can be a first difference value between a number of first data packets and a number of second data packets is greater than the predetermined value. The first data packets represent packets that are sent by the WAN port 12 of the router 1 during a current time interval and the second data packets represent packets that are sent by the WAN port 12 of the router 1 during a previous time interval. The difference value can be a second difference value between a number of third data packets and a number of fourth data packets greater than the predetermined value. The third data packets represent packets that are received by the WAN port 12 of the router 1 during the current time interval and the fourth data packets represent packets that are received by the WAN port 12 of the router 1 during the previous time interval.

In at least one embodiment, the difference value can be a third difference value between a number of fifth data packets and a number of sixth data packets greater than the predetermined value. The fifth data packets represent packets that are sent by the LAN port 11 of the router 1 during the current time interval and the sixth data packets represent packets that are sent by the LAN port 11 of the router 1 during the previous time interval. The difference value can be a fourth difference value between a number of seventh data packets and a number of eighth data packets greater than the predetermined value. The seventh data packets represent packets that are received by the WAN port 12 of the router 1 during the current time interval and the eighth data packets represent packets that are received by the WAN port 12 of the router 1 during the previous time interval.

In at least one embodiment, the detection module 102 can detect whether a number of data packets transmitted between the clients 2 of the LAN port 11 is greater than the predetermined value. In at least one embodiment, the predetermined value is equal to or greater than zero, default is zero.

If the network connection is disabled, the first processing module 103 can force the clients 2 to disconnect from the LAN port 11, and refuse to receive a recertification request from the clients 2. In at least one embodiment, when the clients 2 are disconnected, the clients 2 may broadcast a Dynamic Host Configuration Protocol (DHCP) discover packet over the network 3 to search for a server. The DHCP is a network application protocol used by clients 2 to obtain configuration information of the server in an IP network.

The second processing module 104 can receive the recertification request after a first predetermined time duration. In at least one embodiment, when the server receives the DHCP discover packet from the clients 2, the server may send a DHCP offer packet to the clients 2 in response to the DHCP discover packet. The second processing module 104 may send a DHCP request packet over the network 3 to the server after receiving the DHCP offer packet. Then, the server may send a DHCP ACK packet to the clients 2 in respond to the DHCP request packet and receive the recertification request for updating the IP address of the clients 2. Thus, a network connection is established.

Figure 3:
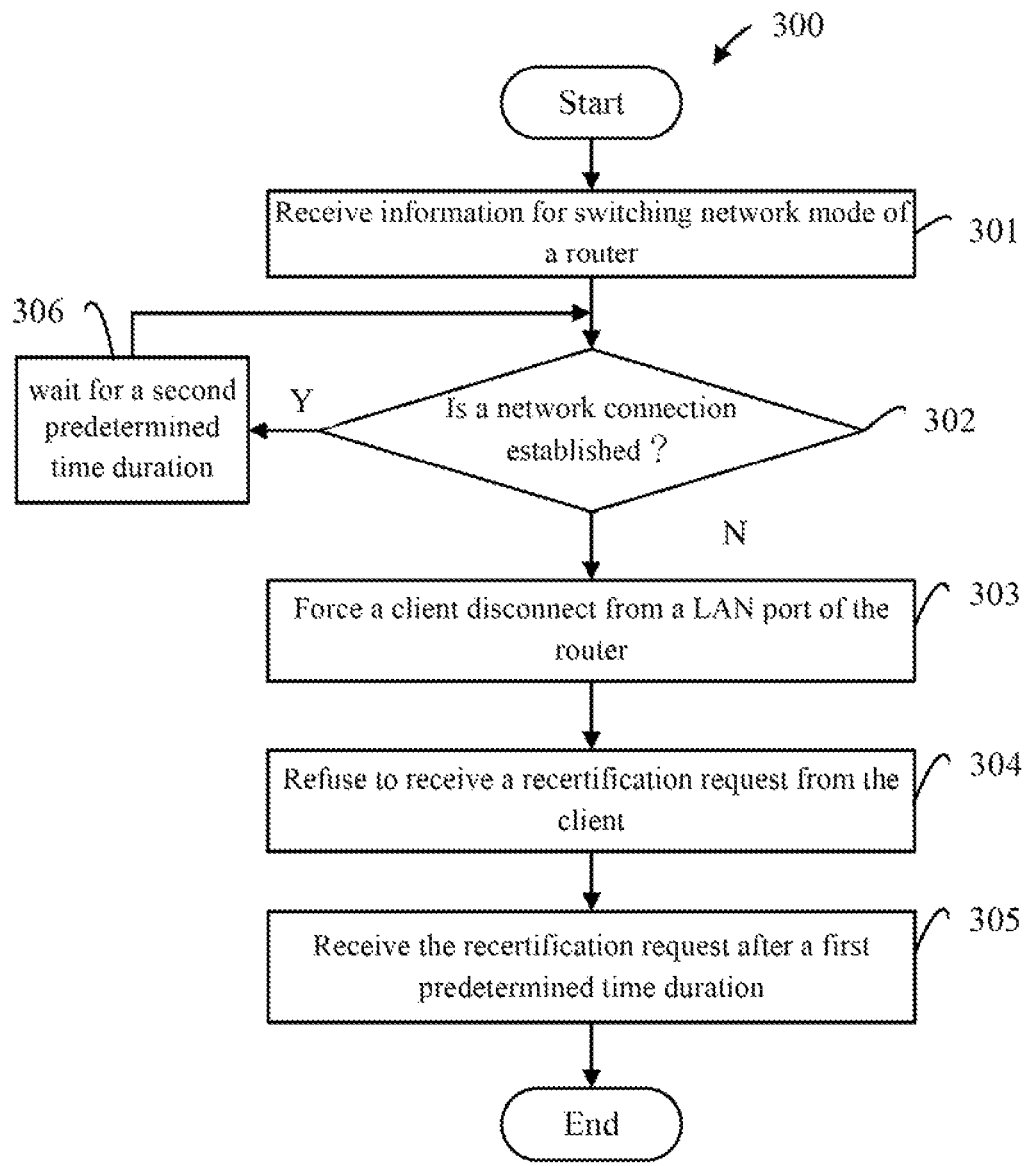
FIG. 3 is a flowchart of an example embodiment of a method for establishing a network connection using a router.

FIG. 3 illustrates a flowchart is presented in accordance with an example embodiment. An example method 300 is provided by way of example, as there are a variety of ways to carry out the method. The example method 300 described below can be carried out using the configurations illustrated in FIG. 1 and FIG. 2, and various elements of these figures are referenced in explaining the example method. Each block shown in FIG. 3 represents one or more processes, methods, or subroutines, carried out in the example method 300. Furthermore, the illustrated order of blocks is illustrative only and the order of the blocks can be changed according to the present disclosure. The example method 300 can begin at block 301. Depending on the embodiment, additional blocks can be utilized and the ordering of the blocks can be changed.

At block 301, a receiving module can receive notification of switching network modes of the router 1. In at least one embodiment, the router 1 can support many different wired or wireless network modes. For example, the router 1 can provide access to the Internet or telecommunication networks such as 3G or 4G through the WAN port 12

At block 302, a detection module 102 can detect establishment by the router of a new network. In at least one embodiment, the detection module detects whether a difference value is greater than a predetermined value. When the difference value is greater than the predetermined value, it can be determined the new network connection is established, the procedure goes to block 306. When the difference value is equal to or less than the predetermined value, it can be determined that the new network connection is not established, the procedure goes to block 303.

In at least one embodiment, the difference value can be a first difference value between a number of first data packets and a number of second data packets. The first data packets represent packets that are sent by the WAN port 12 of the router 1 during a current time interval and the second data packets represent packets that are sent by the WAN port 12 of the router 1 during a previous time interval. The difference value can be a second difference value between a number of third data packets and a number of fourth data packets. The third data packets represent packets that are received by the WAN port 12 of the router 1 during the current time interval and the fourth data packets represent packets that are received by the WAN port 12 of the router 1 during the previous time interval.

In at least one embodiment, the difference value can be a third difference value between a number of fifth data packets and a number of sixth data packets. The fifth data packets represent packets that are sent by the LAN port 11 of the router 1 during the current time interval and the sixth data packets represent packets that are sent by the LAN port 11 of the router 1 during the previous time interval. The difference value can be a fourth difference value between a number of seventh data packets and a number of eighth data packets. The seventh data packets represent packets that are received by the WAN port 12 of the router 1 during the current time interval and the eighth data packets represent packets that are received by the WAN port 12 of the router 1 during the previous time interval.

In at least one embodiment, the detection module can detect whether a number of data packets transmitted between the clients 2 of the LAN port 11 is greater than the predetermined value. In at least one embodiment, the predetermined value is equal to or greater than zero, default is zero At block 303, if the network connection is disabled, a first processing module can force the clients 2 to disconnect from the LAN port 11.

At block 304, the first processing module can refuse to receive a recertification request from the clients 2. In at least one embodiment, when the clients 2 are disconnected, the clients 2 may broadcast a Dynamic Host Configuration Protocol (DHCP) discover packet over the network 3 to search for a server. The DHCP is a network application protocol used by clients 2 to obtain configuration information of the server in an IP network.

At block 305, a second processing module can receive the recertification request after a first predetermined time duration. In at least one embodiment, when the server receives the DHCP discover packet from the clients 2, the server may send a DHCP offer packet to the clients 2 in response to the DHCP discover packet. The second processing module 104 may send a DHCP request packet over the network 3 to the server after receiving the DHCP offer packet. Then, the server may send a DHCP ACK packet to the clients 2 in response to the DHCP request packet and receive the recertification request for updating the IP address of the clients 2. Thus, a network connection is established.

At block 306, the second processing module can wait for a second predetermined time duration, then the procedure returns to block 302.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A router, the router being connected to clients, the router comprising:
   at least one processor;
   a Local Area Network LAN port coupled to the at least one processor; and
   a storage device coupled to the at least one processor;
   wherein the storage device stores one or more programs, executable by the at least one processor, to cause the at least one processor to:
   receive notification of switching network modes of the router;
   detect establishment by the router of a new network;
   force the clients to disconnect from the LAN port of the router in event a new network connection is not established;
   refuse to receive a recertification request from the clients; and
   receive the recertification request after a first predetermined time duration.

2. The router according to claim 1, wherein the programs further cause the at least one processor to:
   wait for a second predetermined time duration if the new network connection is established.

3. The router according to claim 1, wherein the programs further cause the at least one processor to:

detect whether a first difference value between a number of first data packets and a number of second data packets is greater than a predetermined value, wherein the first data packets represent packets that are sent by a Wide Area Network WAN port of the router during a current time interval and the second data packets represent packets that are sent by the WAN port of the router during a previous time interval;

detect whether a second difference value between a number of third data packets and a number of fourth data packets is greater than the predetermined value, wherein the third data packets represent packets that are received by the WAN port of the router during the current time interval and the fourth data packets represent packets that are received by the WAN port of the router during the previous time interval;

detect whether a third difference value between a number of fifth data packets and a number of sixth data packets is greater than the predetermined value, wherein the fifth data packets represent packets that are sent by the LAN port of the router during the current time interval and the sixth data packets represent packets that are sent by the LAN port of the router during the previous time interval;

detect whether a fourth difference value between a number of seventh data packets and a number of eighth data packets is greater than the predetermined value, wherein the seventh data packets represent packets that are received by the WAN port of the router during the current time interval and the eighth data packets represent packets that are received by the WAN port of the router during the previous time interval; and detect whether a number of data packets which transmitted between the clients of the LAN port is greater than the predetermined value.

4. The router according to claim 3, wherein the predetermined value is equal to or greater than zero.

5. A computer-implemented method for establishing network connection, the method comprising:
   receiving, at a router, notification of switching network modes of the router;
   detecting, at the router, establishment by the router of a new network;
   forcing, at the router, the clients to disconnect from a LAN port of the router in event a new network connection is not established;
   refusing, at the router, to receive a recertification request from the clients; and
   receiving, at the router, the recertification request after a first predetermined time duration.

6. The method according to claim 5, further comprising:
   waiting, at the router, for a second predetermined time duration if the new network connection is established.

7. The method according to claim 5, further comprising:
   detecting, at the router, whether a first difference value between a number of first data packets and a number of second data packets is greater than a predetermined value, wherein the first data packets represent packets that are sent by the WAN port of the router during a current time interval and the second data packets represent packets that are sent by the WAN port of the router during a previous time interval;
   detecting, at the router, whether a second difference value between a number of third data packets and a number of fourth data packets is greater than the predetermined value, wherein the third data packets represent packets that are received by the WAN port of the router during the current time interval and the fourth data packets represent packets that are received by the WAN port of the router during the previous time interval;

detecting, at the router, whether a third difference value between a number of fifth data packets and a number of sixth data packets is greater than the predetermined value, wherein the fifth data packets represent packets that are sent by the LAN port of the router during the current time interval and the sixth data packets represent packets that are sent by the LAN port of the router during the previous time interval;

detecting, at the router, whether a fourth difference value between a number of seventh data packets and a number of eighth data packets is greater than the predetermined value, wherein the seventh data packets represent packets that are received by the WAN port of the router during the current time interval and the eighth data packets represent packets that are received by the WAN port of the router during the previous time interval; and detecting, at the router, whether a number of data packets which transmitted between the clients of the LAN port is greater than the predetermined value.

8. The method according to claim 7, wherein the predetermined value is equal to or greater than zero.

9. A non-transitory storage medium having stored thereon instructions that, when executed by a processor of a router, the router being connected to clients causes the processor to perform a network connection establishing method using the router, the method comprising:

receiving notification of switching network modes of the router;

detecting establishment by the router of a new network;

forcing the clients to disconnect from a LAN port of the router in event a new network connection is not established;

refusing to receive a recertification request from the clients; and receiving the recertification request after a first predetermined time duration.

10. The non-transitory storage medium according to claim 9, wherein the method further comprises:

waiting for a second predetermined time duration if the new network connection is established.

11. The non-transitory storage medium according to claim 9, whether the method further comprises:

detecting whether a first difference value between a number of first data packets and a number of second data packets is greater than a predetermined value, wherein the first data packets represent packets that are sent by the WAN port of the router during a current time interval and the second data packets represent packets that are sent by the WAN port of the router during a previous time interval;

detecting whether a second difference value between a number of third data packets and a number of fourth data packets is greater than the predetermined value, wherein the third data packets represent packets that are received by the WAN port of the router during the current time interval and the fourth data packets represent packets that are received by the WAN port of the router during the previous time interval;

detecting whether a third difference value between a number of fifth data packets and a number of sixth data packets is greater than the predetermined value, wherein the fifth data packets represent packets that are sent by the LAN port of the router during the current time interval and the sixth data packets represent packets that are sent by the LAN port of the router during the previous time interval;

detecting whether a fourth difference value between a number of seventh data packets and a number of eighth data packets is greater than the predetermined value, wherein the seventh data packets represent packets that are received by the WAN port of the router during the current time interval and the eighth data packets represent packets that are received by the WAN port of the router during the previous time interval; and detecting whether a number of data packets which transmitted between the clients of the LAN port is greater than the predetermined value.

12. The non-transitory storage medium according to claim 11, wherein the predetermined value is equal to or greater than zero.

* * * * *